United States Patent
Rice et al.

(10) Patent No.: US 6,816,961 B2
(45) Date of Patent: Nov. 9, 2004

(54) PROCESSING ARCHITECTURE HAVING FIELD SWAPPING CAPABILITY

(75) Inventors: Daniel S. Rice, Oakland, CA (US); Ashley Saulsbury, Los Gatos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 541 days.

(21) Appl. No.: 09/802,121

(22) Filed: Mar. 8, 2001

(65) Prior Publication Data

US 2002/0035678 A1 Mar. 21, 2002

Related U.S. Application Data

(60) Provisional application No. 60/187,685, filed on Mar. 8, 2000.

(51) Int. Cl.[7] .............................................. G06F 17/00
(52) U.S. Cl. ...................................................... 712/223
(58) Field of Search ........................................ 712/223

(56) References Cited

U.S. PATENT DOCUMENTS

| | | | | |
|---|---|---|---|---|
| 4,580,238 A | * | 4/1986 | Sawada ...................... | 708/490 |
| 5,446,865 A | * | 8/1995 | Corcoran et al. ............ | 703/26 |
| 5,687,338 A | | 11/1997 | Boggs et al. | |
| 5,867,690 A | * | 2/1999 | Lee et al. .................... | 710/65 |
| 5,890,009 A | * | 3/1999 | Luick et al. .................. | 712/24 |
| 5,900,011 A | | 5/1999 | Saulsbury et al. | |
| 5,909,572 A | | 6/1999 | Thayer et al. | |
| 5,933,650 A | | 8/1999 | van Hook et al. | |
| 6,128,702 A | | 10/2000 | Saulsbury et al. | |
| 6,675,182 B1 | * | 1/2004 | Hofstee et al. ............. | 708/209 |

FOREIGN PATENT DOCUMENTS

WO     WO 80/01423 A1    7/1980

OTHER PUBLICATIONS

"UltraSPARC™ The Visual Instruction Set (VIS™): On Chip Support for New–Media Processing," Sun Microsystems, Hardward & Networking, Microelectronics, White Paper, retrieved from the Internet: http://www.sun.com/microelectronics/whitepapers/ wp95–022, printed Jun. 4, 1999.
8XC251SB Embedded Microcontroller User's Manual, Order No. 272617–001, Intel, Feb. 1995, A1–A144.
Manual for M32000D3FP, Single Chip 32–BIT CMOS Microcomputer, Mitsubishi Microcomputers, Mitsubishi Electric, May 1998.
Subramania Sudharsanan, "MAJC–5200: A High Performance Microprocessor for Multimedia Computing," Sun Microsystems, Inc., Paul Alto, CA.
VIS™ Instruction Set User's Manual, Sun Microsystems, Inc., Palto Alto, CA, Mar. 2000.
VIS™ Instruction Set User's Manual, Sun Microsystems, Sun Microelectronics, Mountain View, CA, Part No.: 805–1394–01, Jul. 1997.
Ruby B. Lee, Hewlett–Packard, "Subword Parallelism with MAX–2," Aug. 1996 IEEE.

* cited by examiner

*Primary Examiner*—Eric Coleman
(74) *Attorney, Agent, or Firm*—Townsend and Townsend and Crew LLP

(57) ABSTRACT

According to the invention, a processing core that includes a first source register, a second source register, a multiplexer, a destination register, and an operand processor is disclosed. The first source register includes a plurality of source fields. The second source register includes a number of result field select values and a number of operation fields. The multiplexer is coupled to at least one of the source fields. Included in the destination register is a plurality of result fields. The operand processor and multiplexer operate upon at least one of the source fields.

21 Claims, 8 Drawing Sheets

Unsigned 64 Data Type

Signed 64 Data Type

Unsigned 32 Data Type

Signed 32 Data Type

Unsigned 16 Data Type

Signed 16 Data Type

Unsigned 8 Data Type

PROCESSING ARCHITECTURE HAVING FIELD SWAPPING CAPABILITY

This application claims the benefit of U.S. Provisional Application No. 60/187,685 filed on Mar. 8, 2000.

CROSS-REFERENCES TO RELATED APPLICATIONS

This application is being filed concurrently with related U.S. patent applications: U.S. patent application Ser. No. 09/802,017 filed on Mar. 8, 2001 entitled "VLIW Computer Processing Architecture with On-chip DRAM Usable as Physical Memory or Cache Memory"; U.S. patent application Ser. No. 09/802,289 filed on Mar. 8, 2001, entitled "VLIW Computer Processing Architecture Having a Scalable Number of Register Files"; U.S. patent application Ser. No. 09/802,108 filed on Mar. 8, 2001 entitled "Computer Processing Architecture Having a Scalable Number of Processing Paths and Pipelines"; U.S. patent application Ser. No. 09/802,324 filed on Mar. 8, 2001 (now U.S. Pat. No. 6,631,439, issued on Oct. 7, 2003), entitled "VLIW Computer Processing Architecture with On-chip Dynamic RAM"; U.S. patent application Ser. No. 09/802,120 filed on Mar. 8, 2001, entitled "VLIW Computer Processing Architecture Having the Program Counter Stored in a Register File Register"; U.S. patent application Ser. No. 09/801,564 filed on Mar. 8 2001, entitled "Processing Architecture Having Parallel Arithmetic Capability"; U.S. patent application Ser. No. 09/802,196 filed on Mar. 8, 2001, entitled "Processing Architecture Having an Array Bounds Check Capability"; U.S. patent application Ser. No. 09/802,020 filed on Mar. 8, 2001, entitled "Processing Architecture Having a Matrix-Transpose Capability"; and, U.S. patent application Ser. No. 09/802,291 filed on Mar. 8, 2001, entitled "Processing Architecture Having a Compare Capability"; all of which are incorporated herein by reference.

BACKGROUND OF THE INVENTION

The present invention relates generally to an improved computer processing instruction set, and more particularly to an instruction set having a byte swapping function.

Computer architecture designers are constantly trying to increase the speed and efficiency of computer processors. For example, computer architecture designers have attempted to increase processing speeds by increasing clock speeds and attempting latency hiding techniques, such as data prefetching and cache memories. In addition, other techniques, such as instruction-level parallelism using VLIW, multiple-issue superscalar, speculative execution, scoreboarding, and pipelining are used to further enhance performance and increase the number of instructions issued per clock cycle (IPC).

Architectures that attain their performance through instruction-level parallelism seem to be the growing trend in the computer architecture field. Examples of architectures utilizing instruction-level parallelism include single instruction multiple data (SIMD) architecture, multiple instruction multiple data (MIMD) architecture, vector or array processing, and very long instruction word (VLIW) techniques. Of these, VLIW appears to be the most suitable for general purpose computing. However, there is a need to further achieve instruction-level parallelism through other techniques.

SUMMARY OF THE INVENTION

The present invention swaps bytes in such a way that allows selecting the field the destination register receives from the source register. In one embodiment, a processing core that includes a first source register, a second source register, a multiplexer, a destination register, and an operand processor is disclosed. The first source register includes a plurality of source fields. The second source register includes a number of result field select values and a number of operation fields. The multiplexer is coupled to at least one of the source fields. Included in the destination register is a plurality of result fields. The operand processor and multiplexer operate upon at least one of the source fields.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

Introduction

The present invention provides a novel computer processor chip having an sub-instruction for swapping bytes that allows selecting which field of the destination register receives which field from the source register. Additionally, embodiments of this sub-instruction allow performing an operation upon the source field before storage in the result field. As one skilled in the art will appreciate, performing an operation upon the source operand before storage increases the instructions issued per clock cycle (IPC). Furthermore, allowing each result field select any of the source fields increases the flexibility of this sub-instruction and increases code efficiency.

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

Processor Overview

Figure 1:
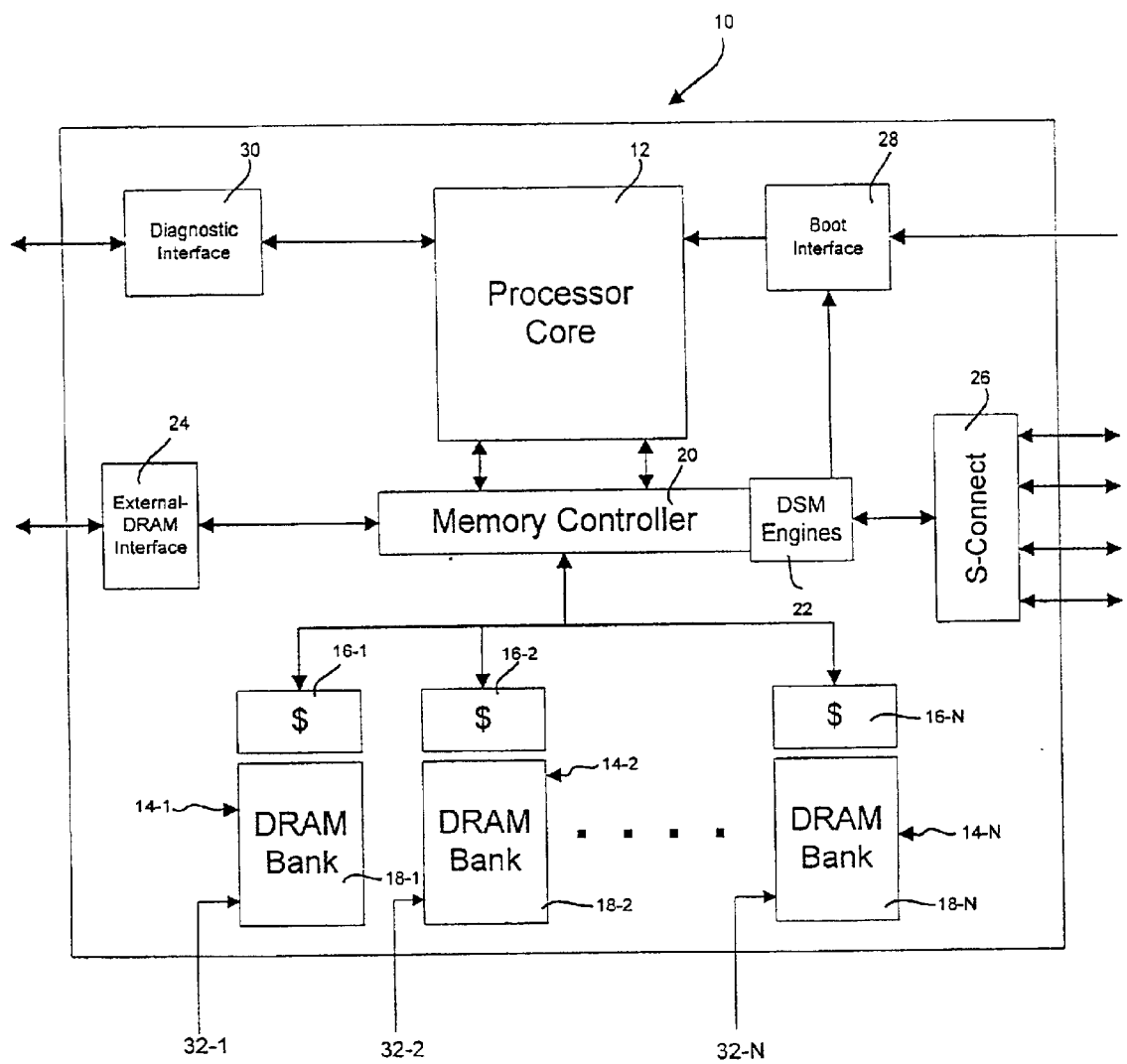
FIG. 1 is a block diagram of an embodiment of a processor chip having the processor logic and memory on the same integrated circuit.

With reference to FIG. 1, a processor chip 10 is shown which embodies the present invention. In particular, processor chip 10 comprises a processing core 12, a plurality of memory banks 14, a memory controller 20, a distributed shared memory controller 22, an external memory interface 24, a high-speed I/O link 26, a boot interface 28, and a diagnostic interface 30.

As discussed in more detail below, processing core 12 comprises a scalable VLIW processing core, which may be configured as a single processing pipeline or as multiple processing pipelines. The number of processing pipelines typically is a function of the processing power needed for the particular application. For example, a processor for a personal workstation typically will require fewer pipelines than are required in a supercomputing system.

In addition to processing core 12, processor chip 10 comprises one or more banks of memory 14. As illustrated in FIG. 1, any number of banks of memory can be placed on processor chip 10. As one skilled in the art will appreciate, the amount of memory 14 configured on chip 10 is limited by current silicon processing technology. As transistor and line geometries decrease, the total amount of memory that can be placed on a processor chip 10 will increase.

Connected between processing core 12 and memory 14 is a memory controller 20. Memory controller 20 communicates with processing core 12 and memory 14, and handles the memory I/O requests to memory 14 from processing core 12 and from other processors and I/O devices. Connected to memory controller 20 is a distributed shared memory (DSM) controller 22, which controls and routes I/O requests and data messages from processing core 12 to off-chip devices, such as other processor chips and/or I/O peripheral devices. In addition, as discussed in more detail below, DSM controller 22 is configured to receive I/O requests and data messages from off-chip devices, and route the requests and messages to memory controller 20 for access to memory 14 or processing core 12.

High-speed I/O link 26 is connected to the DSM controller 22. In accordance with this aspect of the present invention, DSM controller 22 communicates with other processor chips and I/O peripheral devices across the I/O link 26. For example, DSM controller 22 sends I/O requests and data messages to other devices via I/O link 26. Similarly, DSM controller 22 receives I/O requests from other devices via the link.

Processor chip 10 further comprises an external memory interface 24. External memory interface 24 is connected to memory controller 20 and is configured to communicate memory I/O requests from memory controller 20 to external memory. Finally, as mentioned briefly above, processor chip 10 further comprises a boot interface 28 and a diagnostic interface 30. Boot interface 28 is connected to processing core 12 and is configured to receive a bootstrap program for cold booting processing core 12 when needed. Similarly, diagnostic interface 30 also is connected to processing core 12 and configured to provide external access to the processing core for diagnostic purposes.

Processing Core

1. General Configuration

As mentioned briefly above, processing core 12 comprises a scalable VLIW processing core, which may be configured as a single processing pipeline or as multiple processing pipelines. A single processing pipeline can function as a single pipeline processing one instruction at a time, or as a single VLIW pipeline processing multiple sub-instructions in a single VLIW instruction word. Similarly, a multi-pipeline processing core can function as multiple autonomous processing cores. This enables an operating system to dynamically choose between a synchronized VLIW operation or a parallel multi-threaded paradigm. In multi-threaded mode, the VLIW processor manages a number of strands executed in parallel.

In accordance with one embodiment of the present invention, when processing core 12 is operating in the synchronized VLIW operation mode, an application program compiler typically creates a VLIW instruction word comprising a plurality of sub-instructions appended together, which are then processed in parallel by processing core 12. The number of sub-instructions in the VLIW instruction word matches the total number of available processing paths in the processing core pipeline. Thus, each processing path processes VLIW sub-instructions so that all the sub-instructions are processed in parallel. In accordance with this particular aspect of the present invention, the sub-instructions in a VLIW instruction word issue together in this embodiment. Thus, if one of the processing paths is stalled, all the sub-instructions will stall until all of the processing paths clear. Then, all the sub-instructions in the VLIW instruction word will issue at the same time. As one skilled in the art will appreciate, even though the sub-instructions issue simultaneously, the processing of each sub-instruction may complete at different times or clock cycles, because different sub-instruction types may have different processing latencies.

In accordance with an alternative embodiment of the present invention, when the multi-pipelined processing core is operating in the parallel multi-threaded mode, the program sub-instructions are not necessarily tied together in a VLIW instruction word. Thus, as instructions are retrieved from an instruction cache, the operating system determines which pipeline is to process each sub-instruction for a strand. Thus, with this particular configuration, each pipeline can act as an independent processor, processing a strand independent of strands in the other pipelines. In addition, in accordance with one embodiment of the present invention, by using the multi-threaded mode, the same program sub-instructions can be processed simultaneously by two separate pipelines using two separate blocks of data, thus achieving a fault tolerant processing core. The remainder of the discussion herein will be directed to a synchronized VLIW operation mode. However, the present invention is not limited to this particular configuration.

2. Very Long Instruction Word (VLIW)

Figure 2:
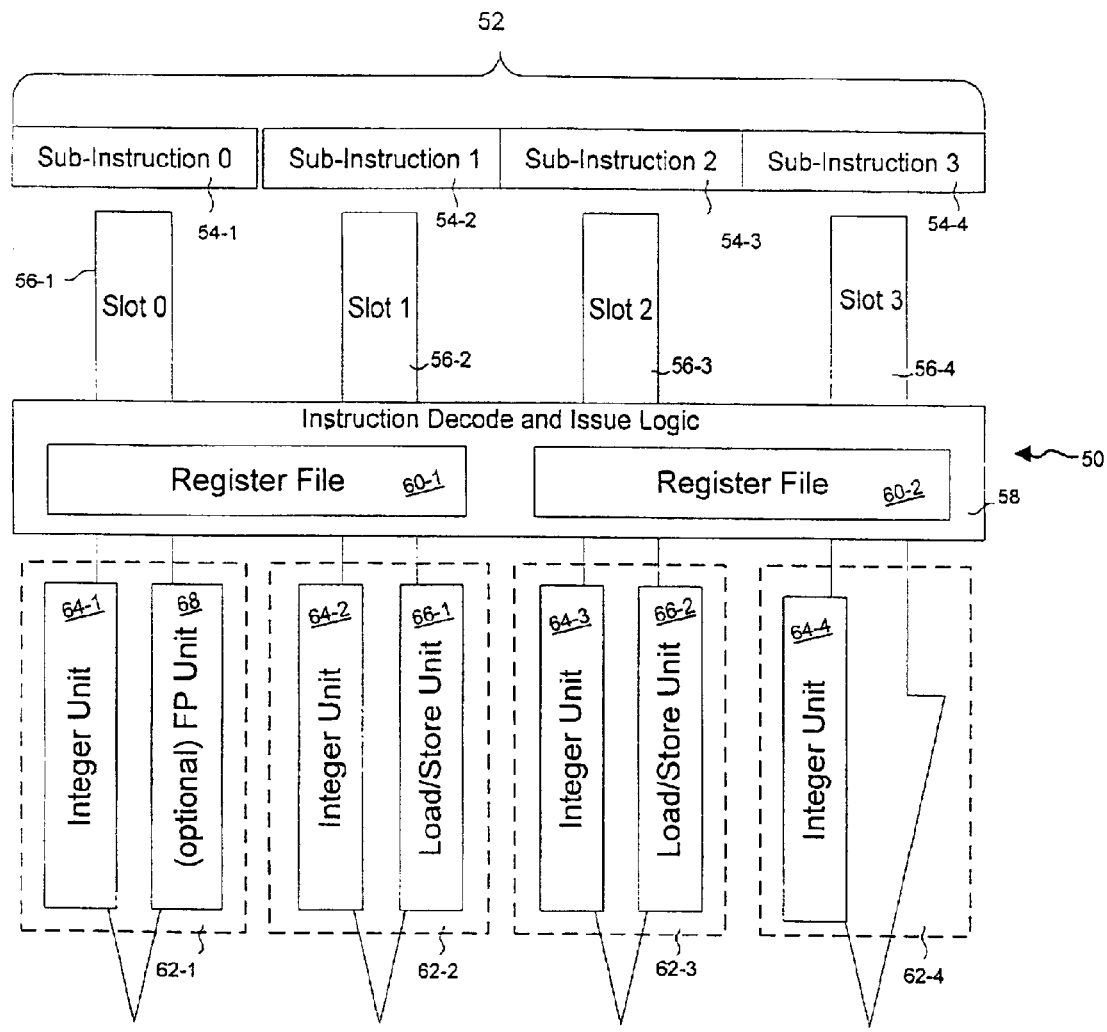
FIG. 2 is block diagram illustrating one embodiment of a processing core having a four-way VLIW pipeline design.

Referring now to FIG. 2, a simple block diagram of a VLIW processing core pipeline 50 having four processing paths, 56-1 to 56-4, is shown. In accordance with the illustrated embodiment, a VLIW 52 comprises four RISC-like sub-instructions, 54-1, 54-2, 54-3, and 54-4, appended together into a single instruction word. For example, an instruction word of one hundred and twenty-eight bits is divided into four thirty-two bit sub-instructions. The number of VLIW sub-instructions 54 correspond to the number of processing paths 56 in processing core pipeline 50. Accordingly, while the illustrated embodiment shows four sub-instructions 54 and four processing paths 56, one skilled in the art will appreciate that the pipeline 50 may comprise any number of sub-instructions 54 and processing paths 56. Typically, however, the number of sub-instructions 54 and processing paths 56 is a power of two.

Each sub-instruction 54 in this embodiment corresponds directly with a specific processing path 56 within the pipeline 50. Each of the sub-instructions 54 are of similar format and operate on one or more related register files 60. For example, processing core pipeline 50 may be configured so that all four sub-instructions 54 access the same register file, or processing core pipeline 50 may be configured to have multiple register files 60. In accordance with the illustrated embodiment of the present invention, sub-instructions 54-1 and 54-2 access register file 60-1, and sub-instructions 54-3 and 54-4 access register file 60-2. As those skilled in the art can appreciate, such a configuration can help improve performance of the processing core.

As illustrated in FIG. 2, an instruction decode and issue logic stage 58 of the processing core pipeline 50 receives VLIW instruction word 52 and decodes and issues the sub-instructions 54 to the appropriate processing paths 56. Each sub-instruction 54 then passes to the execute stage of pipeline 50 which includes a functional or execute unit 62 for each processing path 56. Each functional or execute unit 62 may comprise an integer processing unit 64, a load/store processing unit 66, a floating point processing unit 68, or a combination of any or all of the above. For example, in accordance with the particular embodiment illustrated in FIG. 2, the execute unit 62-1 includes an integer processing unit 64-1 and a floating point processing unit 68; the execute unit 62-2 includes an integer processing unit 64-2 and a load/store processing unit 66-1; the execute unit 62-3 includes an integer processing unit 64-3 and a load/store unit 66-2; and the execute unit 62-4 includes only an integer unit 64-4.

As one skilled in the art will appreciate, scheduling of sub-instructions within a VLIW instruction word 52 and scheduling the order of VLIW instruction words within a program is important so as to avoid unnecessary latency problems, such as load, store and writeback dependencies. In accordance with the one embodiment of the present invention, the scheduling responsibilities are primarily relegated to the software compiler for the application programs. Thus, unnecessarily complex scheduling logic is removed from the processing core, so that the design implementation of the processing core is made as simple are possible. Advances in compiler technology thus result in improved performance without redesign of the hardware. In addition, some particular processing core implementations may prefer or require certain types of instructions to be executed only in specific pipeline slots or paths to reduce the overall complexity of a given device. For example, in accordance with the embodiment illustrated in FIG. 2, since only processing path 56-1, and in particular execute unit 62-1, include a floating point processing unit 68, all floating point sub-instructions are dispatched through path 56-1. As discussed above, the compiler is responsible for handling such issue restrictions in this embodiment.

In accordance with a one embodiment of the present invention, all of the sub-instructions 54 within a VLIW instruction word 52 issue in parallel. Should one of the sub-instructions 54 stall (i.e., not issue), for example due to an unavailable resource, the entire VLIW instruction word 52 stalls until the particular stalled sub-instruction 54 issues. By ensuring that all sub-instructions within a VLIW instruction word 52 issue simultaneously, the implementation logic is dramatically simplified.

3. Data Types

The registers within the processor chip are arranged in varying data types. By having a variety of data types, different data formats can be held in a register. For example, there may be different data types associated with signed integer, unsigned integer, single-precision floating point, and double-precision floating point values. Additionally, a register may be subdivided or partitioned to hold a number of values in separate fields. These subdivided registers are operated upon by single instruction multiple data (SIMD) instructions.

Figure 3:
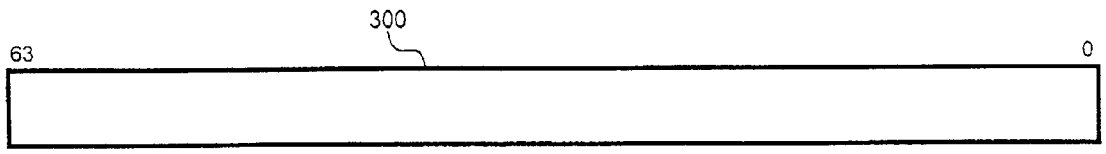
FIG. 3 is a diagram showing some data types generally available to the processor chip.
Figure 3:
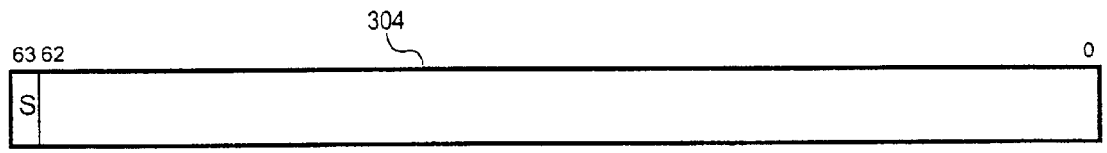
Figure 3:
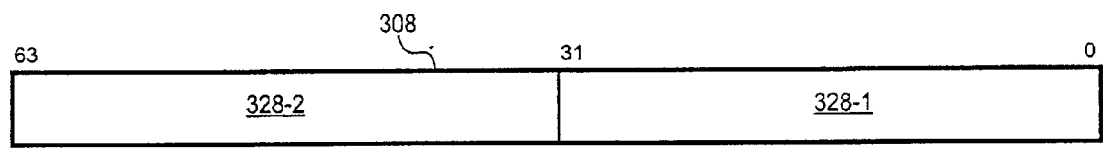
Figure 3:
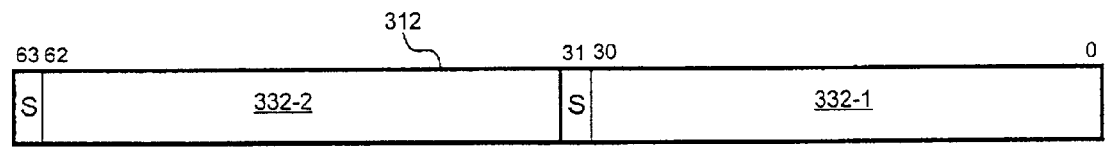
Figure 3:
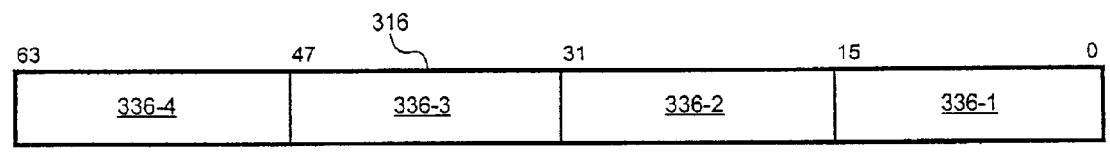
Figure 3:
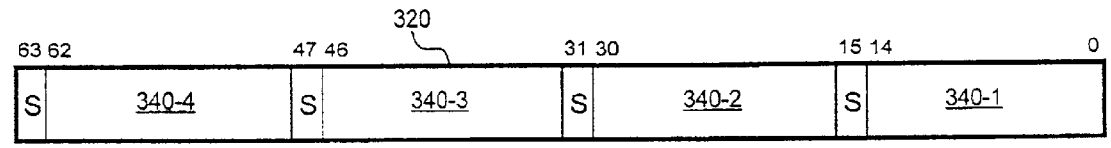
Figure 3:
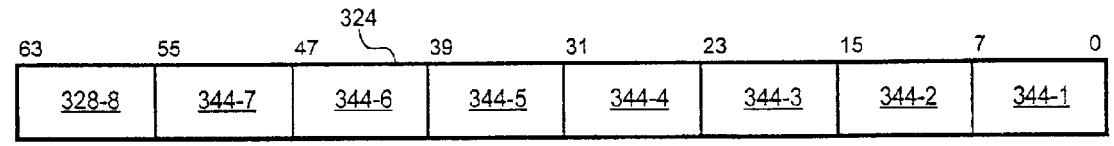

With reference to FIG. 3, some of the data types available for the sub-instructions are shown. In this embodiment, the registers are sixty-four bits wide. Some registers are not subdivided to hold multiple values, such as the signed and unsigned 64 data types 300, 304. However, the partitioned data types variously hold two, four or eight values in the sixty-four bit register. The data types that hold two or four data values can hold the same number of signed or unsigned integer values. The unsigned 32 data type 304 holds two thirty-two bit unsigned integers while the signed 32 data type 308 holds two thirty-two bit signed integers 328. Similarly, the unsigned 16 data type 312 holds four sixteen bit unsigned integers 332 while the signed 16 data type 316 holds four sixteen bit signed integers 340. In this embodiment, register type that holds eight values is only available as an unsigned 8 data type 324. As those skilled in the art appreciate, there are other possible data types and this invention is not limited to those described above.

Although there are a number of different data types, a given sub-instruction 54 may only utilize a subset of these. For example, this embodiment of the byte swap sub-instruction only utilizes the unsigned 64 data type. However, other embodiments could use different data types.

4. Byte Swap Instruction

Figure 4:
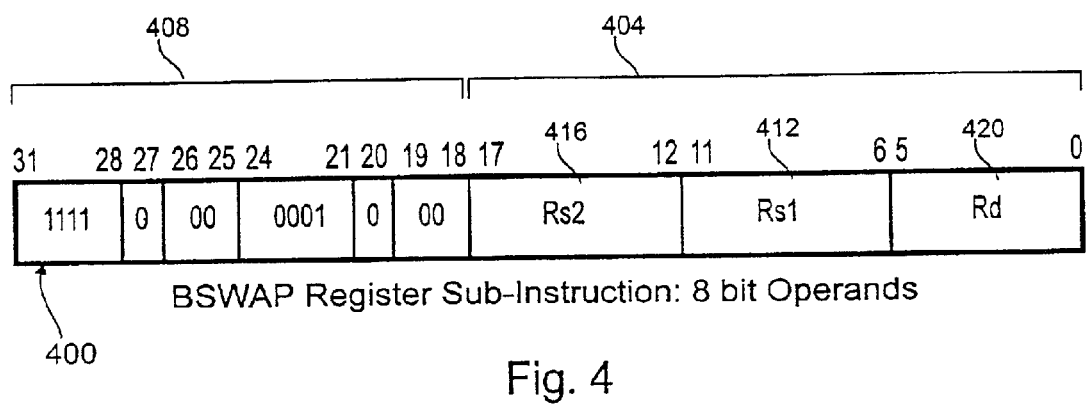
FIG. 4 is a diagram showing an embodiment of machine code syntax for the byte swap sub-instruction.

Referring next to FIG. 4, the machine code for a byte swap sub-instruction ("BSWAP") 400 is shown. This variation of the sub-instruction addressing forms is generally referred to as the register addressing form 400. The sub-instruction 400 is thirty-two bits wide such that a four-way VLIW processor with an one hundred and twenty-eight bit wide instruction word 52 can accommodate execution of four sub-instructions 400 at a time. The sub-instruction 400 is divided into an address and op code portions 404, 408. Generally, the address portion 404 contains the information needed to load and store the operators, and the op code portion 408 indicates which function to perform upon the operators.

The register form of the sub-instruction 400 utilizes three registers. A first and second source addresses 412, 416 are used to load a first and second source registers which each contain a number of source operands in separate fields. A destination address 420 is used to indicate where to store the results into separate fields of a destination register. Since each register 412, 416, 420 is addressed with six bits in this embodiment, sixty-four registers are possible in an on-chip register file 60. In this embodiment, all loads and stores are performed with the on-chip register file 60. However, other embodiments could allow addressing registers outside the processing core 12. Bits 31-18 of the register form 400 of the sub-instruction are the op codes 408 which are used by the processing core 12 to execute the sub-instruction 54. Various sub-instruction types have different amounts of bits devoted to op codes 408.

Typically, a compiler is used to convert assembly language or a higher level language into machine code that contains the op codes. As is understood by those skilled in the art, the op codes control multiplexes, other combinatorial logic and registers to perform a predetermined function. Furthermore, those skilled in the art appreciate there could be many different ways to implement op codes.

5. Byte Swap Implementation

Figure 5:
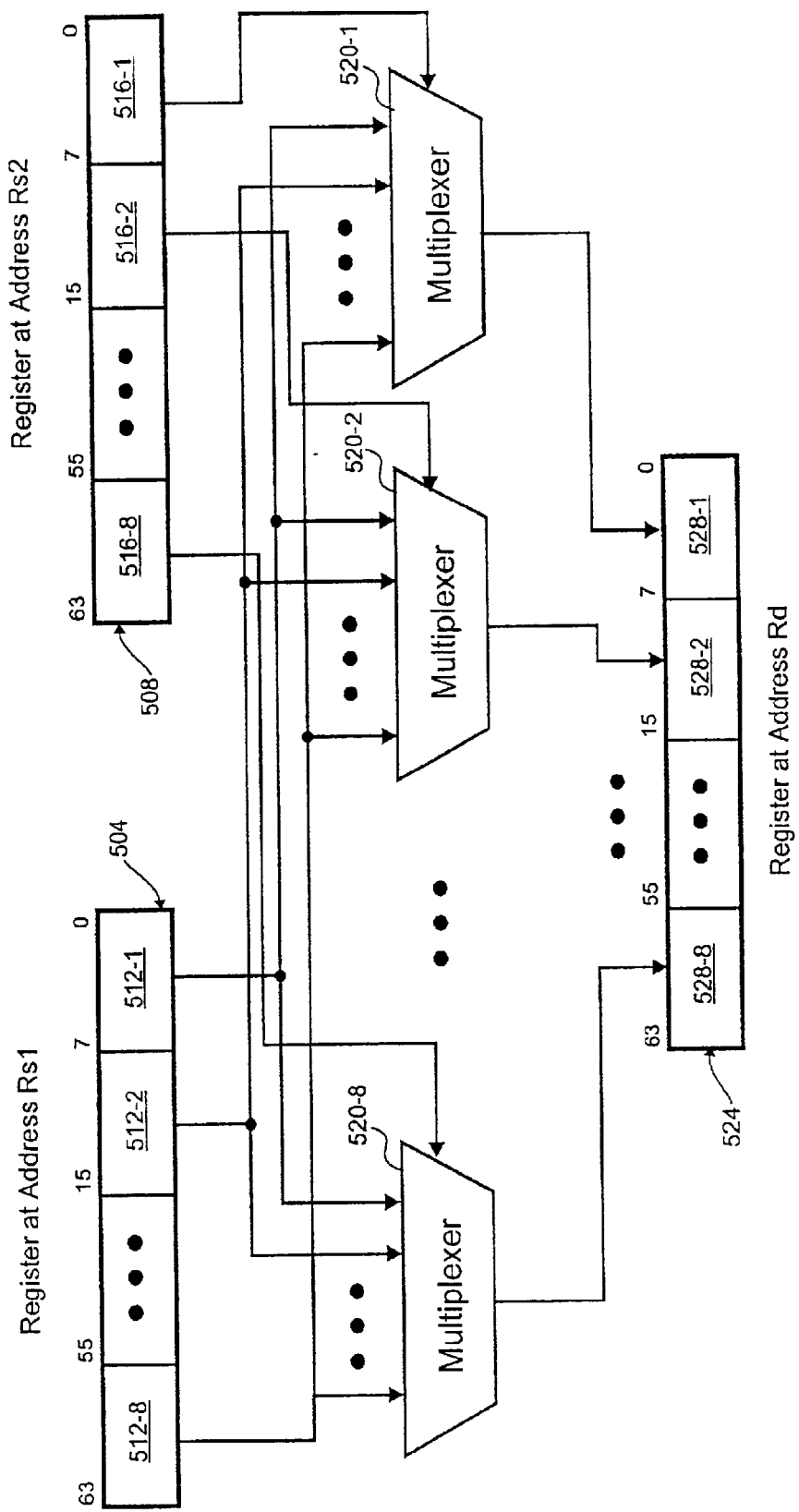
FIG. 5 is a block diagram that schematically illustrates an embodiment of the byte swap function with a partitioned source register having multiple operands.

With reference to FIG. 5, a block diagram of one embodiment of the byte swap operation is shown. This embodiment allows each result field 528 in a destination register 524 to receive any source field 512 from a first source register 504. Each result field 528 has a corresponding result field select value 516 in a second source register 508 which indicates to a multiplexer 520 which source field 512 to load into the result field 528. As those skilled in the art can appreciate, only three bits is required to indicate to the multiplexer 520 that source field to select. Accordingly, the remaining five bits in the selected result fields 516 of the second source register 508 are unused in this embodiment.

The multiplexer 520 couples a selected input to its output. Included in the multiplexer are a number of inputs, a select input and an output. The select input indicates which of the many inputs should be coupled to the output.

The following example illustrates the byte swap operation. In this example, the sixty-four bit first source register 504 contains two pixels (i.e., Rs1=P2; P1) of color information (Rs1=X2, R2, G2, B2; X1, R1, G1, B1) where each pixel is thirty-two bits wide. To scale the image, it is desired to overwrite the second pixel (P2) with the first pixel (P1) such that the destination register 524 contains two copies of the first pixel (i.e., Rd=X1, R1, G1, B1; X1, R1, G1, B1). To accomplish this operation, the assembly sub-instruction would read: BSWAP Rs1 Rs2 Rd where the register Rs2 is preloaded with the constant 0302010003020100h. Each result field 528 has a corresponding multiplexer 520 that selects the desired source field 512. The fields 516 of the second source register 508 hold values from zero to seven which correspond to fields one 512-1 through eight 512-8 in the first source register 504. In this example, the eighth field 516-8 of the second source register holds the value three which indicates the fourth field 512-4 of the first source register 504 is selected by the eighth multiplexer 520-8 and is stored in the eighth field 528-8 of the destination register 524. In this way, the fields 528 of the destination register 524 may store any of the fields 512 of the first source register 504.

Figure 6:
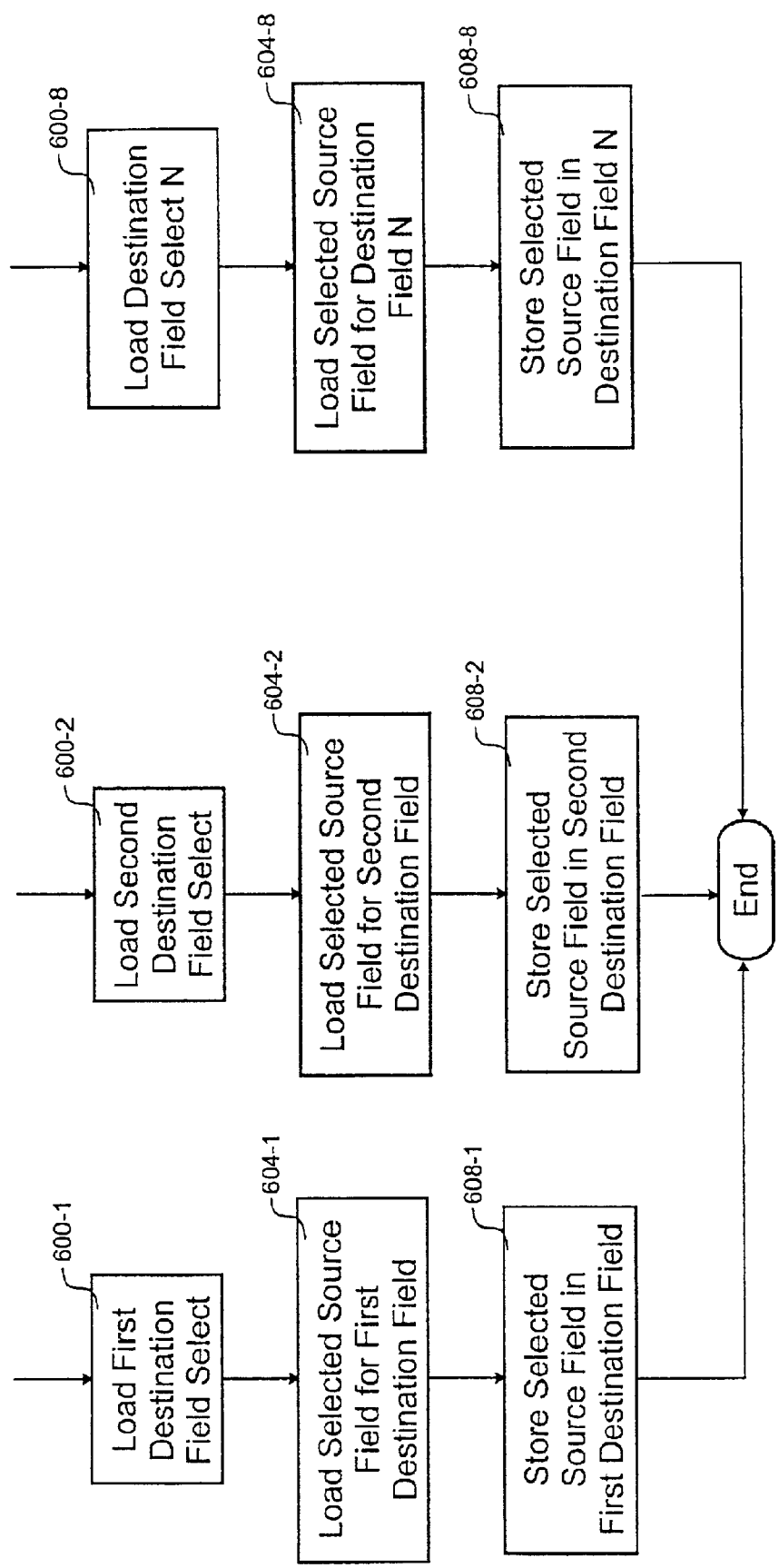
FIG. 6 is a flow diagram of one embodiment of a method that allows selecting a source byte from the source register for each field of the destination register.

With reference to FIG. 6, a flow diagram is shown for the byte swap operation. In steps 600, the result field select values 516 are loaded from the second source register 508. The select fields 516 are coupled to their respective multiplexer 520 In steps 604, the selected source field 512 is loaded for each result field 528 and coupled to the respective multiplexer 520. In this embodiment, the whole first source register 504 is loaded and coupled to the multiplexer 520. After the multiplexer 520 screens away the other source fields 512, the elected source field 512 is stored in the result field 528 in step 608.

Figure 7:
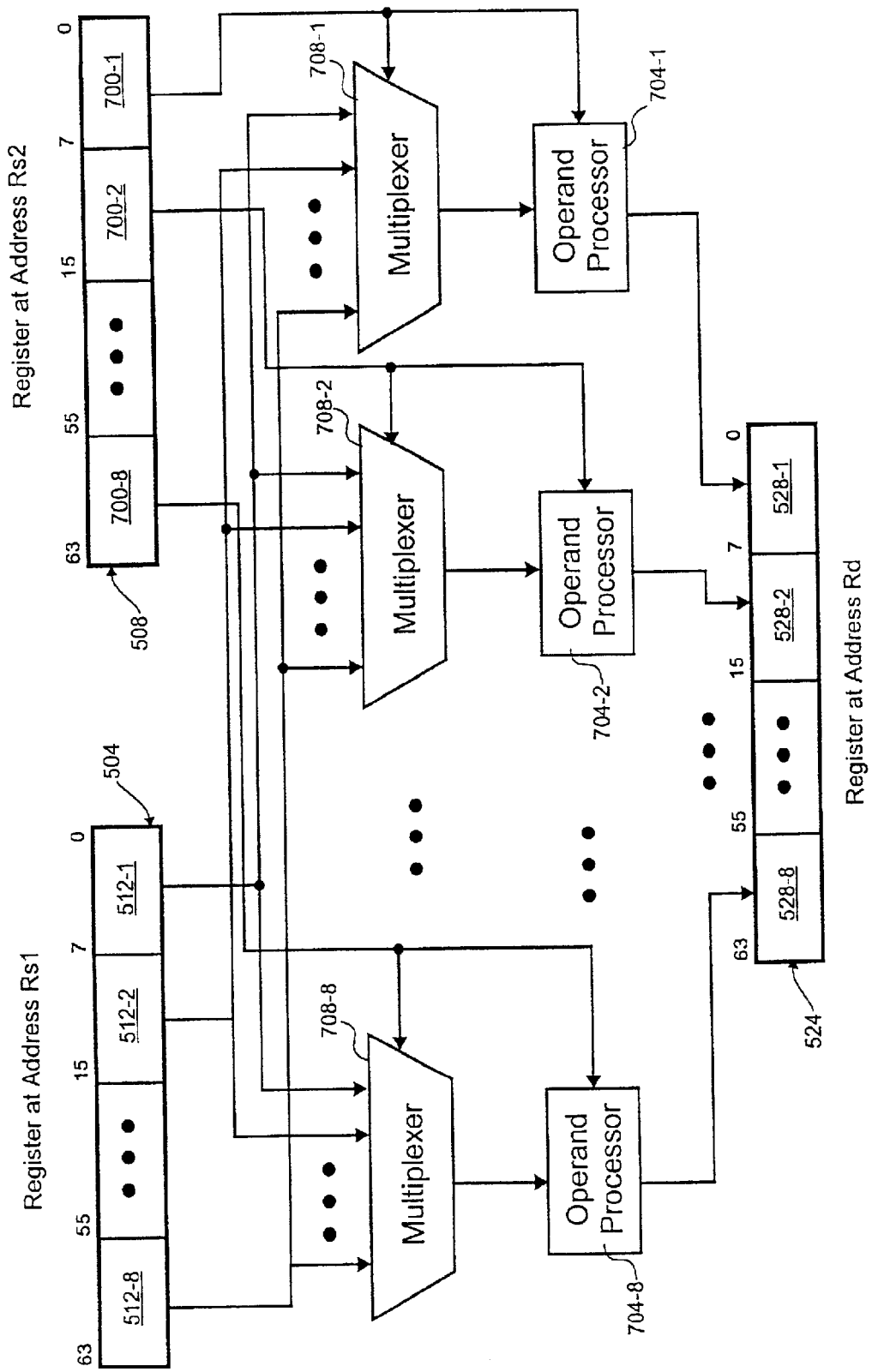
FIG. 7 is a block diagram that schematically illustrates another embodiment of the byte swap function that includes an operand processor for each field of the destination register.
Figure 8:
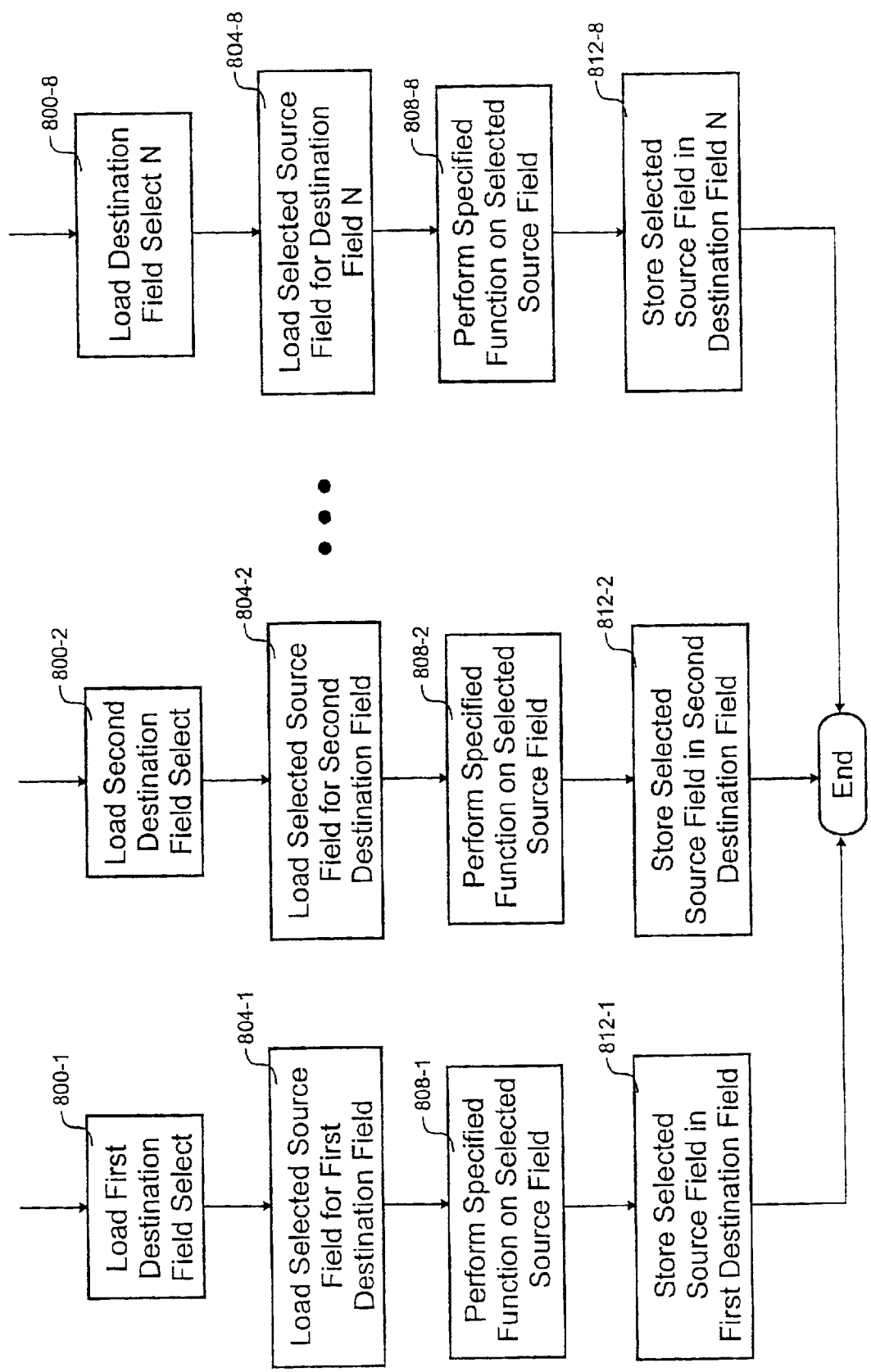
FIG. 8 is a flow diagram of an embodiment of a method that allows selecting a source byte from the source register for each field of the destination register and performing a function upon that source register.

Referring next to FIG. 7, another embodiment of the byte swap operation is shown in block diagram form. This embodiment adds an operand processor 704 for each of the result fields 528. After selection by a multiplexer 708, the operand processor 704 performs a function on the selected source field 512 to create a result. The result is stored in the result field 528 of the destination register 524.

In this embodiment, the second source register 508 includes a number of condition fields 700. Three bits of the condition field 700 is devoted to the result field select value and five bits is devoted to the operation field. The result field select bits select which source field 512 is stored in a result field 528. The operation fields are coupled to their respective operand processors 704.

Manipulations of the selected source fields 512 are performed by the operand processors. The operation field controls which of a number of operations are performed. Table I lists the operations available in this embodiment. For example, an operation field of all zeros would swap bytes without modifying the source field 512 in a manner similar to the embodiment of FIG. 5. However, a operation field equal to eight would bitwise invert the selected source field 512. Allowing this manipulation of the source field 512 increases the code efficiency since this byte swap sub-instruction performs both swapping and manipulation in one instruction issue.

TABLE I

| Operation Field | Operation Performed |
| --- | --- |
| 00000 | Store the source field in the result field without modification |
| 00001 | Set each bit from the source field low |
| 00010 | Extend the highest order bit of the source field to the remaining bits |
| 00011 | Perform no operation and do not store any value to the result field |
| 01000 | Bitwise invert the source field |
| 01001 | Set each bit of the source field high |
| 01010 | Invert the highest order bit of the source field and extend that bit to the remaining bits |
| 10000 | Bitwise reverse the source field |
| 10010 | Extend the lowest order bit of the source field to the remaining bits |
| 11000 | Bitwise invert and reverse the source field |
| 11010 | Invert the lowest order bit of the source field and extend the inverted highest order bit to the remaining bits |

By combining operand manipulation with byte swapping the number of sub-instructions for a given function is significantly reduced. For example, a source register ("Src") contains two packed pixels (Src=P1; P2) where each are thirty-two bits wide. Each pixel has three fields corresponding to the primary colors red, green and blue (i.e., P2=X2, R2, G2, B2 and P1=X1, R1, G1, B1). In this example, the first red component (R1) from the src register overwrites both of the red components (R4, R3) in a destination register ("Dest") containing two more packed pixels (Dest=P4;P3). The desired result is the Dest register having the original pixel values except for the red component which is from the first pixel (i.e., Dest=X4, R1, G4, B4, X3, R1, G3, B3).

The embodiment of FIG. 5 takes four sub-instructions to accomplish this, but the present embodiment only requires issuing one sub-instruction. Table II shows the assembly sub-instructions required for the embodiment of FIG. 5. Although not shown in the table, the sixty-four bit constants are preloaded into the registers since this embodiment does not support sixty-four bit immediate values. The first sub-instruction performs a byte swap such that the first red component (R1) overwrites the second red component (R2) (i.e., Out=X2, R1, G2, B2, X1, R1, G1, B1). In the next step, everything but the first red components is masked away (i.e., Mask1=00, R1, 00, 00, 00, R1, 00, 00). The second AND sub-instruction masks away the red components (R4, R3) from the destination register (i.e., Mask2=X4, 00, G4, B4, X3, 00, G3, B3). In the final step, the two masked registers are combined to achieve the desired result.

TABLE II

| Sub-Instruction | Explanation |
| --- | --- |
| LOAD Swp 0702050403020100h | Load the constant 0702050403020100h into the Swp register |
| BSWAP Swp Src Out | Overwrite R2 of Src with R1 of Src and write the result to Out |
| AND 00FF000000FF0000h Out Mask1/ | Mask away everything from Out except the R1 byte fields and store in Mask1 |
| AND FF00FFFFFF00FFFFh Dest Mask2 | Mask away R4 and R3 from Dest and store in Mask2 |
| OR Mask1 Mask2 Dest | Concatenate together Mask1 and Mask2 and store in Dest |

However, the present embodiment only requires a single sub-instruction to accomplish the same result because of the additional operand processor 704. In assembly language, the sub-instruction is BSWAP Swp Src Dest where the Swp register is preloaded with the constant 180218181802181818h. With reference to Table III, the result field select value in the condition field 700 indicates which field 512 in the source register 504 replaces the field 528 in the destination register 524. The operation field portion of the condition field 700 indicates whether a replace operation (op field=00000b) occurs or no replacement occurs (op field=00011b). Since fields 8, 6–4, 2, and 1 are not replaced, the selected field in the first source register 504 does not matter. However, a value of source field zero is used in this example.

TABLE III

| Condition: | Field 8 | Field 7 | Field 6 | Field 5 | Field 4 | Field 3 | Field 2 | Field 1 |
|---|---|---|---|---|---|---|---|---|
| Operation: | No op | Insert | No op | No op | No op | Insert | No op | No op |
| Binary Op: | 00011b | 00000b | 00011b | 00011b | 00011b | 00000b | 00011b | 00011b |
| Select: | 000b | 010b | 000b | 000b | 000b | 010b | 000b | 000b |

Conclusion

In conclusion, the present invention provides a novel computer processor chip having an sub-instruction for swapping bytes which allows selecting which field of the destination register receives which field from the source register. Additionally, embodiments of this sub-instruction allow performing an operation upon the source field before storage in the result field. While a detailed description of presently preferred embodiments of the invention is given above, various alternatives, modifications, and equivalents will be apparent to those skilled in the art. For example, while the embodiment of the processing core discussed above relates to swapping bytes, other embodiments could swap source fields of different sizes. In addition, although the operand processor only has a limited number of functions, other embodiments could include more functions. Therefore, the above description should not be taken as limiting the scope of the invention that is defined by the appended claims.

What is claimed is:

1. A processing core for executing instructions, comprising:
    a first source register including a plurality of source fields;
    a second source register including a plurality of result field select values and a plurality of operation fields;
    a multiplexer coupled to at least one of the source fields;
    a destination register including a plurality of result fields; and
    an operand processor coupled to at least one of the result fields, wherein the operand processor and multiplexer operate upon at least one of the plurality of source fields.

2. The processing core of claim 1, wherein:
    the multiplexer includes a mux input, a select input and a mux output; and
    the operand processor includes a processor input, a processor output and a condition input.

3. The processing core for executing instructions of claim 2, wherein the mux input is coupled to at least one of the source fields.

4. The processing core for executing instructions of claim 2, wherein the select input is coupled to at least one of the result field select values.

5. The processing core for executing instructions of claim 2, wherein the processor input is coupled to the mux output.

6. The processing core for executing instructions of claim 2, wherein the condition input is coupled to at least one of the operation fields.

7. The processing core for executing instructions of claim 2, wherein the processor output is coupled to at least one of the result fields.

8. The processing core for executing instructions of claim 1, wherein the operand processor performs an operation selected from a group consisting of:
    setting each bit from the source field low,
    extension of a highest order bit of the source field to remaining bits,
    bitwise inversion of the source field,
    setting each bit of the source field high,
    inversion of the highest order bit of the source field and extension of the highest order bit to remaining bits,
    bitwise reversion of the source field,
    extension of the lowest order bit of the source field to remaining bits,
    bitwise inversion and reversion of the source field, and
    inversion of the lowest order bit of the source field and extension of the inverted highest order bit to remaining bits.

9. The processing core for executing instructions of claim 1, wherein the operand processor selectively stores a result in one of the result fields.

10. A method for performing an operation in a data processing machine, the method comprising step of:
    selecting a source field from a source register having a first bit numbering;
    manipulating the first source field to produce a result different from the source field; and
    storing the result in a result field of a destination register having a second bit numbering, wherein:
    the first and second bit numberings are identical,
    the result originates from the source field having a first range included in the first bit numbering,
    the result field has a second range included in the second bit numbering,
    the first range is different from the second range; and
    the manipulating and storing steps are associated with the same instruction issue.

11. The method for performing the operation in the data processing machine as recited in claim 10, further comprising a step of loading the source field from the source register.

12. The method for performing the operation in the data processing machine as recited in claim 10, wherein the manipulating step includes a step selected from a group consisting of:
    setting each bit from the source field low,
    extending a highest order bit of the source field to remaining bits,
    bitwise inverting the source field,
    setting each bit of the source field high,
    inverting the highest order bit of the source field and extending the highest order bit to remaining bits,
    bitwise reverting the source field,
    extending the lowest order bit of the source field to remaining bits, bitwise inverting and reverting of the source field, and inverting of the lowest order bit of the source field and extending the inverted highest order bit to remaining bits.

13. The method for performing the operation in the data processing machine as recited in claim 10, wherein the source field is eight bits wide.

14. A method for performing an operation in a data processing machine, the method comprising steps of:

loading a first source field from a source register;

loading a second source field from the source register;

manipulating the first source field to produce a first result;

manipulating the second source field to produce a second result;

storing the first result in a second result field of a destination field; and storing the second result in a first result field of the destination field, wherein at least three of the preceding steps are associated with a single instruction.

15. The method for performing the operation in the data processing machine of claim 14, wherein the result field is eight bits wide.

16. The method for performing the operation in the data processing machine of claim 14, wherein the first result is different from the first source field.

17. The method for performing the operation in the data processing machine of claim 14, wherein the second result is different from the second source field.

18. The method for performing the operation in the data processing machine of claim 14, wherein the manipulation step includes a step selected from a group consisting of:

setting each bit from the source field low, extending a highest order bit of the source field to remaining bits, bitwise inverting the source field, setting each bit of the source field high, inverting the highest order bit of the source field and extending the highest order bit to remaining bits, bitwise reverting the source field, extending the lowest order bit of the source field to remaining bits, bitwise inverting and reverting of the source field, and inverting of the lowest order bit of the source field and extending the inverted highest order bit to remaining bits.

19. The method for performing the operation in the data processing machine of claim 14, wherein the loading, storing and manipulating steps are part of a same instruction issue.

20. The method for performing the operation in the data processing machine of claim 14, wherein the single instruction is a sub-instruction part of a VLIW instruction word.

21. The method for performing the operation in the data processing machine of claim 14, wherein all of the steps are associated with a single instruction.

* * * * *